March 11, 1958 G. ELLIOTT 2,826,691

OSCILLATION GENERATOR

Filed Feb. 3, 1954 2 Sheets-Sheet 1

INVENTOR.
GEORGE ELLIOTT
BY T. L. Bowes
ATTORNEY

INVENTOR.
GEORGE ELLIOTT
BY T. L. Bowes
ATTORNEY

United States Patent Office 2,826,691

Patented Mar. 11, 1958

2,826,691

OSCILLATION GENERATOR

George Elliott, Rochester, N. Y., assignor, by mesne assignments, to General Dynamics Corporation, a corporation of Delaware

Application February 3, 1954, Serial No. 407,908

2 Claims. (Cl. 250—36)

This invention relates to oscillation generators and more particularly to oscillation generators which are arranged to periodically vary both the amplitude and frequency of the oscillations.

There are applications where it is desirable to provide alternating currents which vary periodically in amplitude and frequency. One typical application is in the field of telephony where it may be desired to apply a so-called "howler" tone to a subscriber's line as an audible signal for attracting attention at the subscriber's station to an off-hook or unrestored condition of a receiver or handset.

It is an object of this invention to provide a new and improved tone oscillation generator in which oscillations, which may be employed as a signaling tone, gradually increase in amplitude during a given interval of time and also gradually change in frequency during that interval.

Still another object of this invention is to provide a new and improved oscillation generator in which timing means is provided for controlling means for varying periodically the amplitude and frequency of the generator.

Yet another object of this invention is to provide a new and improved oscillation generator of the electronic type.

In the preferred embodiment of my invention there is provided a suitable electron tube oscillator and means for controlling the frequency and amplitude of the oscillations produced by the oscillator. In order to effect the desired control there is provided means for developing a periodically recurring timing wave, as for example through the agency of a blocking oscillator. The volume or amplitude controlling means may comprise an electron discharge device having its anode-cathode path in series with the anode supply of the oscillator whereby variations in the current flow in the volume control tube effect changes in the anode potential of the oscillator tube and corresponding variations in the amplitude of the oscillations. The frequency controlling means in the illustrated embodiment of this invention comprises a reactance tube, the output of which is applied to the grid circuit of the oscillator tube for effecting control of the frequency of oscillation of the oscillator. The timing wave is employed to control not only the conductivity of the volume control tube but also the effective reactance of the reactance tube.

Figure 1:
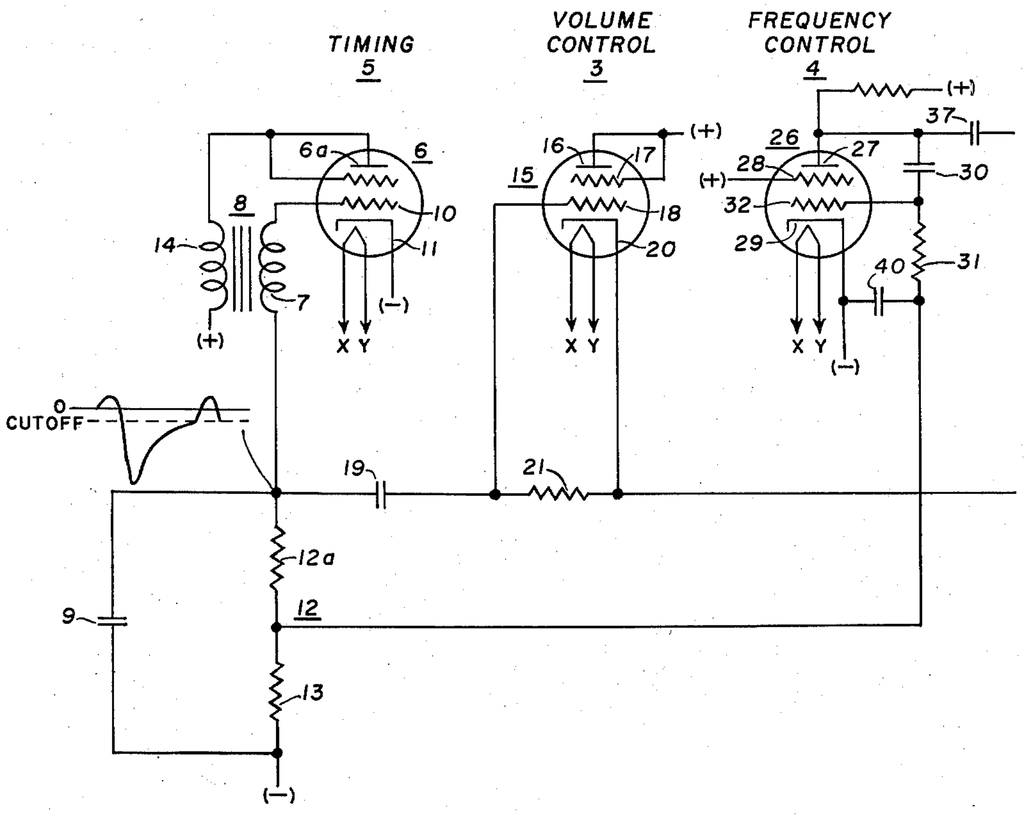
Figure 2:
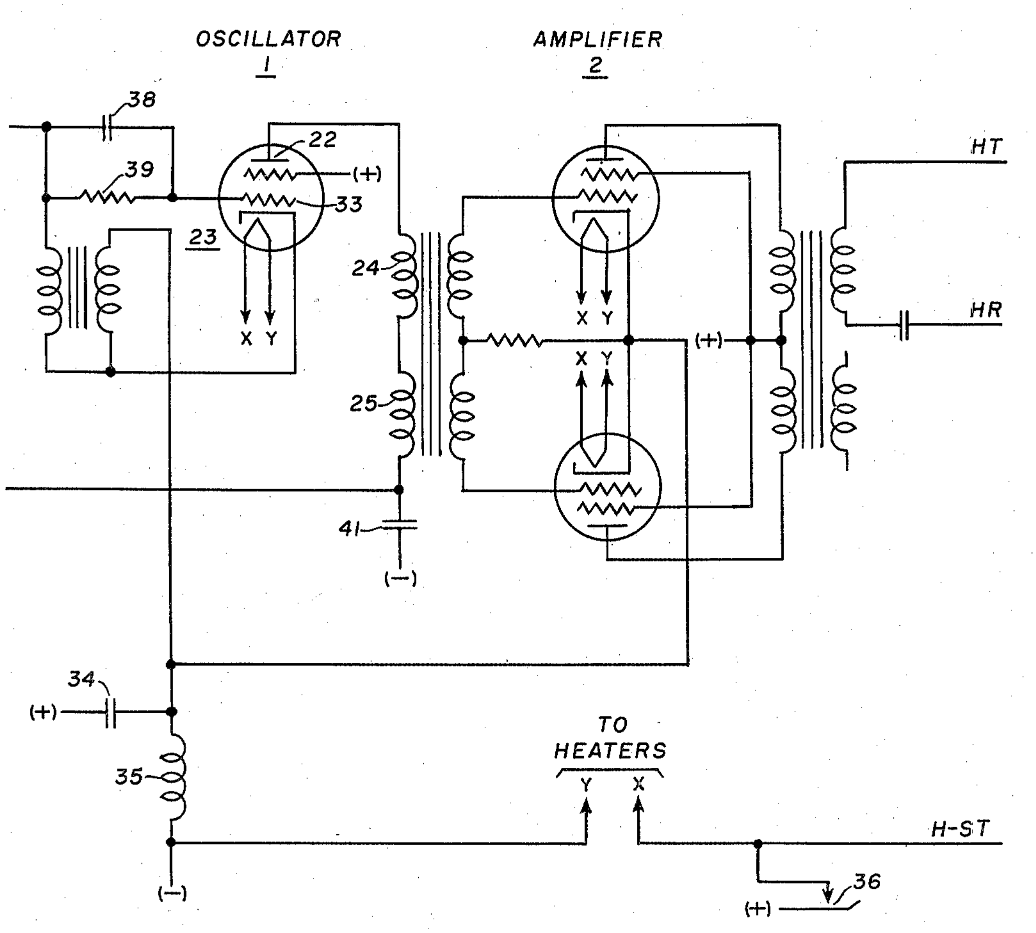

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which:

Figs. 1 and 2, when placed side to side, comprise a schematic diagram of an oscillation generator having the above-described characteristics.

Referring to the drawings, there is shown an oscillator 1, which may be of any suitable type, the output of which is suitably amplified as by means of amplifier 2 of the push-pull type. The output of amplifier 2 is shown applied to the outgoing leads HT and HR which, for example, may be connected through suitable telephone circuits to the tip and ring conductors of a telephone subscriber's line. Means is provided for simultaneously changing the amplitude and frequency of oscillation of oscillator 1. For this purpose there is provided volume control means 3 and frequency control means 4. In order to provide means for controlling the rate of volume and frequency control changes, there is provided timing means 5.

Describing the present invention in detail, timing means 5 in the illustrated embodiment of this invention comprises a blocking oscillator of the transformer-coupled type including an electron discharge device 6 which may be of the screen grid type. The grid winding 7 of transformer 8 is connected in series with capacitor 9 between the control electrode or grid 10 of electron discharge device 6 and a suitable source of negative potential which may be the negative terminal of the 48 volt station battery of a conventional telephone system. Cathode 11 is also connected to the same source of negative potential so that winding 7 and capacitor 9 can be considered to be connected between grid 10 and cathode 11. Capacitor 9 is shunted by a voltage divider 12 in the form of resistance means comprising series connected resistors **12*a* and 13. A second or anode winding 14 of transformer 8 is connected between anode 6*a* of discharge device 6** and a suitable source of positive potential which, in accordance with conventional telephone practice, is connected to ground.

If it be assumed that capacitor 9 was negatively charged by the preceding cycle of the blocking oscillator, device 6 is biased well below cut-off. As the charge on capacitor 9 leaks off, the grid bias voltage is reduced to such a point that discharge device 6 begins to conduct. As anode current starts to flow a magnetic field is set up around anode winding 14. This field builds up from zero to a maximum value in proportion to the amount of anode current and induces a voltage in grid winding 7. The resulting induced voltage is impressed on control electrode or grid 10 with a polarity tending to drive grid 10 more positive as the field in anode winding 14 builds up. Grid 10 when driven positive with respect to cathode 11 draws current and electrons accumulate on the plate of capacitor 9 which is nearest to grid 10. As the anode current through device 6 nears saturation, the field established by anode winding 14 ceases to increase. Capacitor 9 begins to discharge which causes the grid potential to become less positive so that less anode current flows in anode winding 14 and the field around the anode winding begins to collapse. This collapsing field induces a voltage in the grid winding 7 in a reverse direction, causing grid 10 to become more negative until the discharge device 6 is driven beyond cut-off. The shape of the curve of voltage versus time is shown adjacent the upper plate of capacitor 9 in Fig. 1. The time consumed by the rise and decay of anode current is determined by the inductance and resistance of transformer 8 and the time between pulses is determined primarily by the value of resistance and capacitance. For use as a source of "howler" tone, it is preferred that the constants of the blocking oscillator circuit be chosen to provide a wave having peaks spaced about five seconds apart.

The voltage divider 12 comprising resistor **12*a* and 13 is utilized as a voltage source for regulating volume control means 3 and frequency control means 4. Referring to volume control means 3, there has been provided a suitable electron discharge device 15 shown as a screen grid type, having an anode 16 and screen grid or electrode 17 connected to the grounded positive terminal of the station battery. Control electrode or grid 18 is connected to the junction of winding 7 and capacitor 9 through a suitable coupling capacitor 19. Cathode 20 is connected to grid 18 through a suitable grid resistor 21 which provides a direct current path between grid 18 and cathode 20. The potential of grid 18 follows the alternating current component of potential appearing at the upper plate of capacitor 9. The volume control circuit is so arranged that discharge device 15 is cut off very briefly at the peaks of the negative bias applied to grid 18. As capacitor 9 discharges the grid voltage increases and anode current through the discharge device 15** increases.

Means is provided for utilizing the varying flow of current through device 15 for controlling the amplitude of oscillation of oscillator 1. For this purpose anode 22 of oscillator discharge device or tube 23 is connected to the positive terminal of the station battery through primary windings 24 and 25 of transformer 26 and the conductive path through discharge device 15, i. e., the lower end of transformer winding 25 is connected to cathode 20 of discharge device 15. Thus, as capacitor 9 discharges and discharge device 15 becomes more conductive, the voltage drop between anode 16 and cathode 20 becomes less whereby the potential at anode 22 rises. There results an increased amplitude of oscillation output. In order to provide a low impedance path for the oscillator current to by-pass the volume control device, capacitor 41 may be connected between cathode 20 and the negative terminal of the station battery.

Voltage divider 12 is also employed as a voltage source for effecting variation in reactance of the frequency control means 4. In the arrangement shown in the drawings, frequency control means 4 comprises an electron discharge device 26 illustrated as being of the screen grid type arranged as a reactance tube. Anode 27 is connected to the positive terminal of the station battery through a suitable resistor. Screen grid or electrode 28 is shown connected directly to the positive terminal of the station battery. Cathode 29 is connected to the negative terminal of the station battery. A phase shifting network comprising capacitor 30 and resistor 31 is connected between anode 27 and the junction between resistors **12*a* and 13, grid or control electrode 32 being connected to the junction between capacitor 30 and resistor 31. Thus the network comprising capacitor 30 and resistor 31 is connected across the anode-cathode path through resistor 13. By-pass capacitor 40 is connected between the lower end of resistor 31 and cathode 29**.

Means is thus provided for varying the bias voltage applied to grid electrode 32. As the voltage at the junction of resistors **12*a* and 13 varies according to the charge on capacitor 9, the voltage at grid 32 varies correspondingly and the reactance between cathode 29 and anode 27** changes with the resulting anode current changes.

In order to translate the reactance changes into frequency of oscillator 1, the anode 27 of discharge device 26 is connected to grid or control electrode 33 of oscillator 1 through a suitable coupling capacitor 37 and the self-biasing network comprising capacitor 38 shunted by resistor 39. By means of the foregoing arrangement, frequency variations in the output of oscillator 1 are obtained which correspond to the bias voltage variation at grid 32.

In order to prevent tone or oscillations from leaking back on the negative battery lead, there is provided a filter comprising capacitor 34 and inductance 35 connected as shown.

One side of each heater element of the various electron discharge devices is connected to the negative battery supply as indicated by the letter "Y." The other terminals of the heater elements, indicated by the letter "X," are connected to the positive battery terminal either through manually operable start key 36 or by way of conductor HST from a suitable control circuit which may, for example, be a wire chief's test circuit in a telephone exchange. For example, conductor HST may be connected to the positive station battery terminal through make contacts 421 of relay 420 in Fig. 4 of the copending application of William W. Pharis, Serial No. 420,777, filed April 5, 1954, now Patent No. 2,785,237, issued March 12, 1957, and assigned to the same assignee as the present invention.

Whenever a grounded positive potential appears on conductor HST the various electron discharge device heaters become energized, oscillator 1 begins to generate oscillations when its heater reaches operating temperature, and an output appears on conductors HT and HR as a tone which varies in frequency and amplitude according to the operation of volume control 3 and frequency control 4.

While I have shown and described a particular embodiment of my invention, it will be obvious to those skilled in the art that changes and modifications may be made without departing from my invention in its broader aspects. For example, while I have shown electron discharge devices, the present invention may equally well be accomplished by means of transistors in place of tubes. I, therefore, aim in the appended claims to cover all such changes and modifications as fall within the true spirit and scope of my invention.

What I claim is:

1. An oscillation generator comprising an oscillator electron discharge device having an anode, a control electrode and a cathode; means for causing said oscillator device to produce preiodic oscillations; means for producing a periodically recurring timing wave; means for causing said oscillations to vary periodically in amplitude comprising a second electron discharge device having an anode, a control electrode and a cathode, the anode of said oscillator device being connected to the cathode of said amplitude control discharge device, the anode of said amplitude control device being connected to a source of positive potential whereby said amplitude control device is connected in the anode supply circuit for said oscillator device, and means for applying said timing wave to said control electrode of said amplitude controlling device whereby current conduction through said amplitude control device varies in accordance with variations in said timing wave and the amplitude of oscillations of said oscillator device varies in accordance with said variations in conductivity; and means for causing said oscillations to vary periodically in frequency comprising a reactance tube having input and output circuits, means for connecting said reactance tube output circuit to the input circuit of said oscillator device, and means utilizing said timing wave for varying the input to said reactance device whereby the effective reactance is varied in accordance with variations in said timing wave and the frequency of oscillation of said oscillator device is varied in accordance with such changes in effective reactance.

2. The oscillation generator of claim 1 in which the timing wave producing means comprises a capacitor, means for periodically charging and discharging said capacitor, and resistance means connected across said capacitor.

References Cited in the file of this patent

UNITED STATES PATENTS

| | | |
|---|---|---|
| 1,632,054 | Brown | June 14, 1927 |
| 2,337,533 | Barber | Dec. 28, 1943 |
| 2,401,372 | Rienstra | June 4, 1946 |
| 2,455,472 | Curl et al. | Dec. 7, 1948 |
| 2,460,637 | Hige | Feb. 1, 1949 |
| 2,590,809 | Wallace | Mar. 25, 1952 |